US006498850B1

(12) United States Patent
Walker et al.

(10) Patent No.: US 6,498,850 B1
(45) Date of Patent: Dec. 24, 2002

(54) MULTICHANNEL ECHO CANCELLER WITH A COMPANDER

(75) Inventors: Michael Walker, Baltmannsweiler (DE); Hans Jürgen Matt, Remseck (DE); Armin Mann, Stuttgart (DE); Fritz Weinschenk, Aichwald (DE); Holger Söhnle, Mönsheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/282,212

(22) Filed: Mar. 31, 1999

(30) Foreign Application Priority Data

Apr. 9, 1998 (DE) ......................... 198 15 942

(51) Int. Cl.[7] .......................... H04M 9/08; H04M 1/00; H04B 3/20
(52) U.S. Cl. .................. 379/406.01; 379/406.02; 379/406.03; 379/406.04; 379/406.05; 379/406.07; 379/406.09; 379/406.1; 379/406.11; 379/406.12; 379/426.13; 379/406.14; 379/406.13; 370/291; 370/290
(58) Field of Search ................. 379/406.01–406.15; 370/32.1, 85.1

(56) References Cited

U.S. PATENT DOCUMENTS

| 3,780,233 A | * 12/1973 | Campanella et al. ... 379/406.11 |
| 4,467,146 A | 8/1984 | Lassaux |
| 4,712,235 A | * 12/1987 | Jones, Jr. ............... 379/406.08 |
| 4,766,589 A | * 8/1988 | Fisher ................... 379/406.01 |
| 4,891,837 A | 1/1990 | Walker et al. |
| 4,924,492 A | 5/1990 | Gitlin |
| 5,148,426 A | * 9/1992 | Shenoi et al. .......... 379/406.01 |
| 5,570,423 A | 10/1996 | Walker et al. |
| 5,790,632 A | * 8/1998 | Antonio et al. ........ 379/406.15 |
| 5,920,548 A | * 7/1999 | El Malki .................... 379/410 |
| 5,987,098 A | * 11/1999 | Wintour ................ 379/406.06 |
| 6,134,224 A | * 10/2000 | Reese et al. ........... 379/406.01 |

FOREIGN PATENT DOCUMENTS

| DE | 42 27 327 A1 | 2/1994 |
| DE | 43 05 256 A1 | 8/1994 |
| DE | 195 37 772 A1 | 4/1997 |
| DE | 196 11 548 A1 | 9/1997 |
| EP | 0 627 825 A2 | 12/1994 |
| EP | 0 792 029 A2 | 8/1997 |

OTHER PUBLICATIONS

ITU–T No. G.165 dated 03/93 General Characteristics of International Telephone Connections and International Telephone Circuit—Echo Cancellers.

* cited by examiner

Primary Examiner—Forester W. Isen
Assistant Examiner—Ramnandan Singh
(74) Attorney, Agent, or Firm—Sughrue Mion, PLLC

(57) ABSTRACT

A compander circuit (20) for echo cancellation in telecommunications apparatus with an estimator module (21) for estimating an echo coupling and a delay of a line echo and a characteristic module (23) with an associated multiplier (24) for controlling the short-time output level of $z_{out}(k)$ as a function of the short-time input level of $z_{in}(k)$ is characterized in that at all inputs and outputs of the compander circuit (20), a plurality of N communications channels are applied and outputted, respectively, at an N-fold clock rate as compared with a single communications channel; that all memory units in the compander circuit (20) are designed as multiplexer-buffer-demultiplexer (MBD) units (30); and that a modulo-N counter (26) is provided which controls all MBD units (30) so that in each of the MBD units (30), always the same memory cell ($35_1$, $35_2$, $35_N$) assigned to a particular communications channel is addressed.

9 Claims, 3 Drawing Sheets

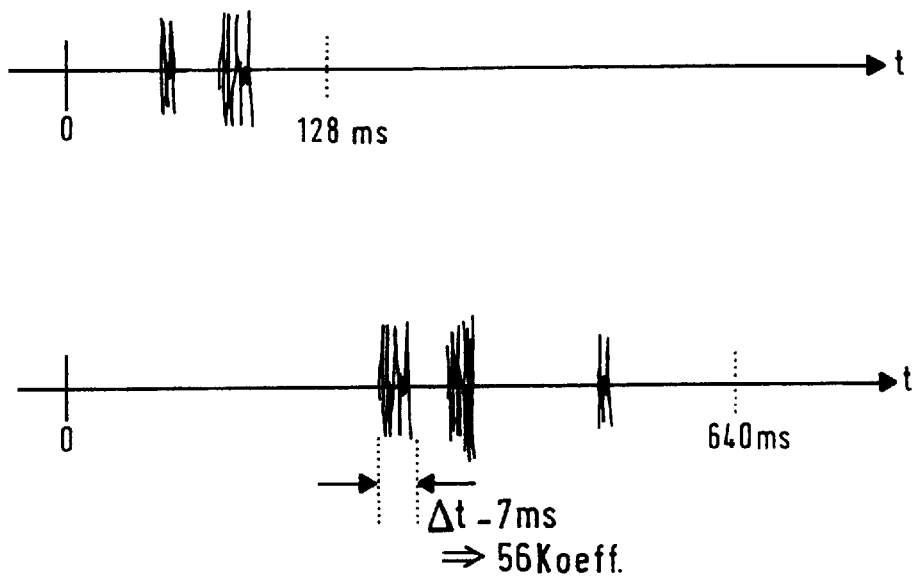
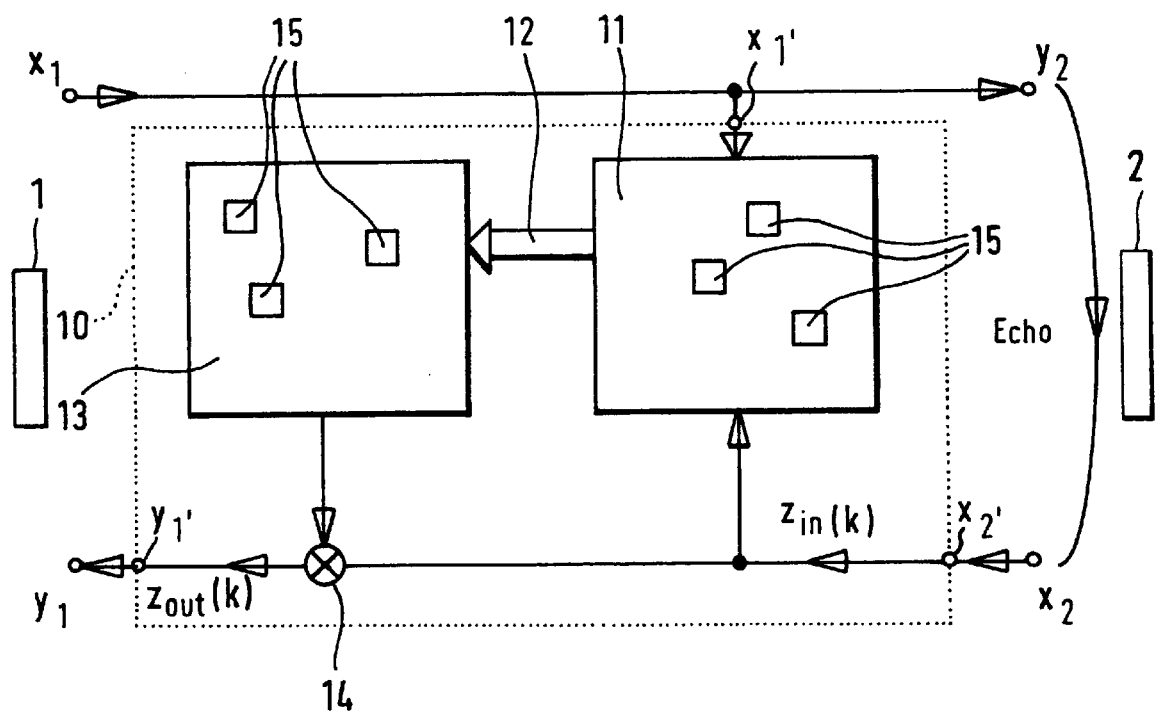
Fig.1
Fig.2

MULTICHANNEL ECHO CANCELLER WITH A COMPANDER

BACKGROUND OF THE INVENTION

This invention relates to a compander circuit for echo cancellation in telecommunications apparatus, such as terminals, transmission systems, or switching equipment, having an input $x'_1$, at which a send signal sent from a near-end subscriber 1 to a far-end subscriber 2 is applied, an input $x'_2$, at which a receive signal $z_{in}(k)$ coming from the far-end subscriber 2 and a far-end echo, possibly consisting of a number of component echoes, are applied, an output $y'_1$, at which the receive signal $z_{out}(k)$ processed in the compander circuit is passed on to the near-end subscriber 1, an estimator module for estimating an echo coupling and a delay of a line echo, and a characteristic module with an associated multiplier for controlling the short-time output level of $z_{out}(k)$ as a function of the short-time input level of $z_{in}(k)$.

Such a compander circuit is disclosed, for example, in DE 37 24 346 A1.

When speech signals are transmitted over telecommunications lines, acoustic echoes may be caused at the "near end", i.e., at the sending user, by the direct sound transmission from the loudspeaker to the microphone of the terminal. Particularly if several terminals are located near each other, for example in an office or conference room with many telephone terminals, the near-end echo problem is aggravated considerably since each loudspeaker signal is coupled to each microphone. This is to be remedied by a multichannel echo canceling method and circuit proposed in EP 0 627 825 A2.

Aside from the near-end acoustic echo, however, a line echo, i.e., an electrical echo, which may consist of different numbers of component echoes, is caused by reflections of transmitted speech signals at different points in the transmission channel, for example at 2- to 4-wire hybrids in the terminal or at central offices and at interfaces between analog and digital networks. A distinction is generally made between so-called near-end echoes, which are reflected to the talker in a period up to 128 ms, and so-called far-end echoes, which return to the talker in a period up to 640 ms. Because of the round-trip delay time, echoes are particularly disconcerting to the talker as the latter has meanwhile continued talking when his own reflected speech signal returns to him. Delayed far-end echoes occur, for example, during intercontinental calls, i.e., calls transmitted via deep sea cables or satellites. Operators of corresponding telephone networks are therefore anxious to suppress all kinds of echoes, particularly far-end echoes with long delays, but also near-end echoes, which may be reflected with a higher intensity, as effectively as possible.

EP 0 792 029 A2, for example, proposes an echo canceler with an adaptive filter which comprises a coarse near-end speech detector and a more accurate near-end speech detector which are disposed at both sides of the echo canceler and thus can observe the incoming signal prior to and after the echo cancellation. In non-speech intervals of the near end, an adaptation to reflected echo values is to be effected.

DE 44 30 189 A1 proposes a low-cost method suitable for use under different acoustic conditions which uses an FIR filter whose filter coefficients are determined by the NMLS algorithm. For echo cancellation in a telecommunications network with a plurality of parallel channels, such an echo canceler with an adaptive FIR filter, which is implemented in software on a digital signal processor, is employed for each channel. The adaptive FIR filter is to produce a replica of the total echo to be expected, which may consist of a number of component echoes, and subtract this replica from the actual echo signal transmitted to the telecommunications terminal.

U.S. Pat. No. 5,148,426 shows an echo canceling arrangement in which a PCM multiplexer and network monitoring functions are integrated with the echo canceler in one package in order to reduce the amount of cabling and patching required and the errors associated therewith. The technical implementation of a single echo canceler which can serve a plurality of communications channels simultaneously is not shown. Only the spatially separated functions, particularly auxiliary functions for the classical performance monitoring functions, are combined with the echo canceler in one unit. The echo canceling unit proper handles only single channels by measuring the signal-to-noise ratio and the echo level of each channel. In this manner, monitoring of the quality of the individual channels, of DS1 level performance (24 64-kb/s channels), and of DS3 level performance (28 times 24 channels) is implemented in a device of bidirectional design.

U.S. Pat. No. 4,467,146 discloses an echo canceler with a digital transversal filter which produces a replica of the for-end line echo and subtracts this replica from the incoming signal. The proposed arrangement is to improve the echo cancellation for digital PCM multiplex transmission systems in which speech samples are encoded with a quasi-logarithmic characteristic. Since prior-art digital echo cancelers operate with uniformly quantized sampling characteristics (linear), samples formed with nonuniform characteristics (A-law or m-law) must first be converted back to uniformly quantized samples. Errors are caused since the sum signal was nonuniformly quantized at the exchange-side analog-to-digital converter. According to U.S. Pat. No. 4,467,146, the errors of the nonuniform quantization are to be calculated and corrected.

Aside from the above-described method of filtering out replicated echo signals, a further, easier-to-implement echo cancellation method is known, namely the so-called compander principle. The coupling and delay of a line echo are estimated in an estimator circuit, and if the short-time receive level is correspondingly reduced, the output level is reduced during non-speech intervals by means of a characteristic module in such a manner that the incoming line echo and any background noise are effectively suppressed. No general echo subtraction from the incoming signal is performed in the receive path, but only a "masking" of the echo in the non-speech intervals by a corresponding reduction of the short-time output level. While one of the two subscribers is talking, i.e., in the presence of a high input level, the output level is held in an upper range by a corresponding shift in the characteristic module, since the considerably weaker echo is then "hidden" under the high level of the speech signal and has no disturbing effect. This compander principle is described, for example, in the above-mentioned DE 37 24 346 A1.

SUMMARY OF THE INVENTION

The prior-art echo canceler systems with companders are only suited for providing an echo cancellation function to individual transmission channels. The present invention has for its object to improve an echo canceling compander circuit of the kind described at the beginning in such a manner that with a single compander circuit, a plurality of channels, preferably more than 2000 channels, can be handled simultaneously, with a minimum amount of additional circuitry being required to modify the compander circuit.

The invention is characterized in that at all inputs and outputs of the compander circuit, a plurality of N communications channels are applied and outputted, respectively, at an N-fold clock rate as compared with a single communications channel; that all memory units in the compander circuit are designed as multiplexer-buffer-demultiplexer (MBD) units; and that a modulo-N counter is provided which controls all MBD units in such a manner that in each of the MBD units, always the same memory cell assigned to a particular communications channel is addressed.

BRIEF DESCRIPTION OF THE DRAWINGS

Embodiments of the invention will now be explained in more detail with reference to the accompanying drawings, in which:

FIG. 1 shows in the upper half the time variation of a typical near-end echo sequence with two component echoes and in the lower half a far-end echo sequence with three component echoes.

FIG. 2 shows a prior-art compander for echo cancellation in a single communications channel, comprising an estimator module, a characteristic module, and a multiplier;

DETAILED DESCRIPTION OF THE PREFERRED EMBODIMENTS

Figure 3:
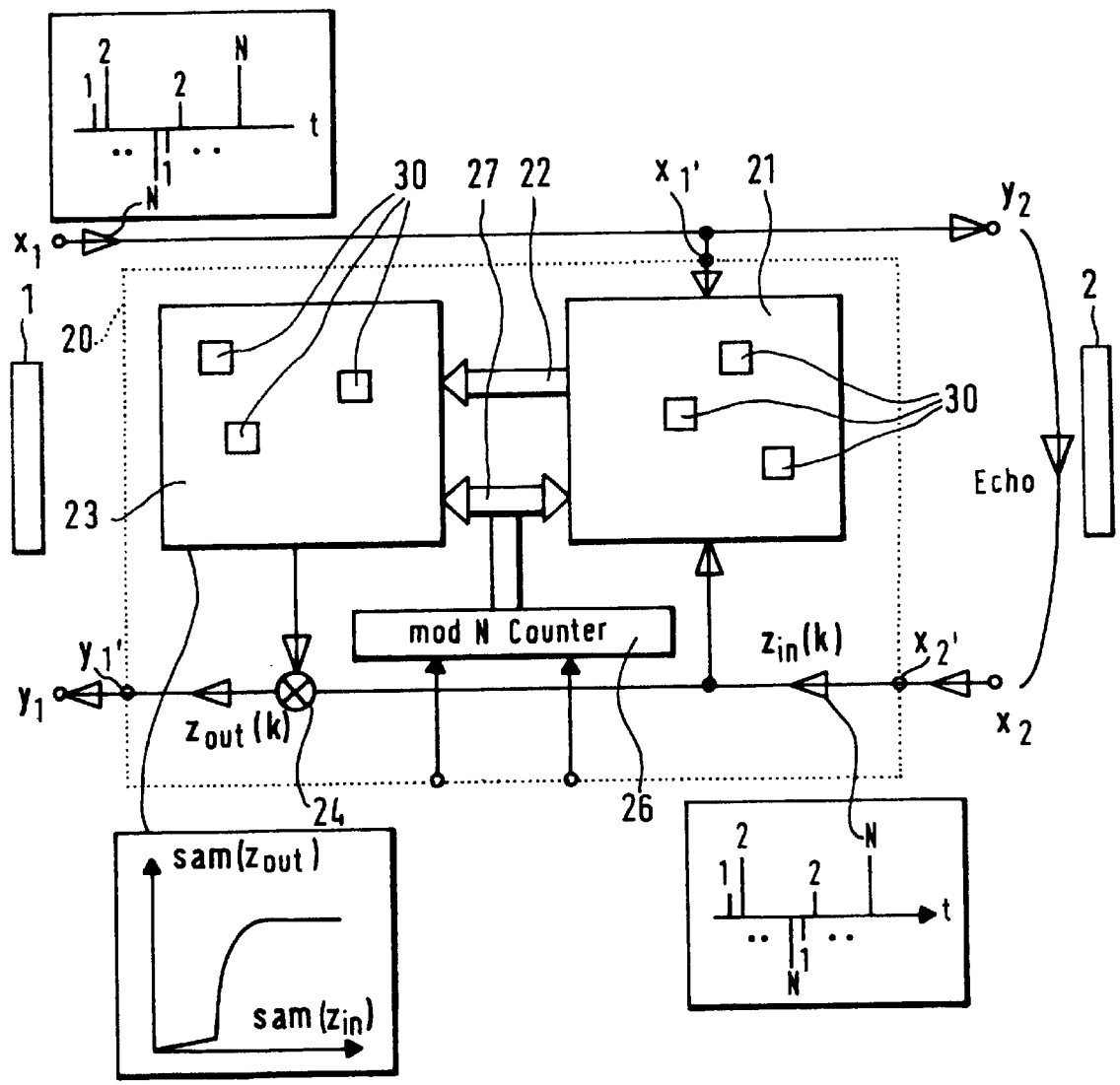
FIG. 3 is a schematic diagram of a multichannel compander circuit according to the invention, along with schematically indicated $x_1$ and $x_2$ samples and a typical compander characteristic.

The compander circuit according to the invention, an expanded single-channel compander circuit, is operated at N times the clock rate of a single-channel circuit according to the number N of simultaneously served communications channels. The modulo-N counter controls all MBD units synchronously via an address bus, so that in each MBD unit, always the same memory cell associated with a given channel is addressed. In this manner, at a currently unproblematic clock rate of, e.g., 16 MHz, approximately 2000 communications channels can be served with a single compact echo canceling compander circuit using very little additional circuitry.

In a particularly compact embodiment, the compander circuit according to the invention is implemented on an application-specific integrated circuit (ASIC) chip. Because of the high packing density of an ASIC, the physical size of the circuit can be kept relatively small in spite of the fact that it provides a large number of communications channels with an echo canceling function.

In a particularly preferred development of this embodiment, the MBD units are implemented on an external memory chip separate from the ASIC, preferably on a random access memory (RAM) chip. In this manner, the amount of chip area required for the ASIC, and thus the production costs of the ASIC, can be kept to a minimum. Implementation on a commercially available standard RAM is particularly low in cost. In another preferred embodiment, a digital signal processor is provided which can activate and deactivate different types of characteristics to meet customer requirements. Thus, characteristics with a 45° rise can be used for level-faithful signal reproduction, and horizontal portions of characteristics can be used for signal regeneration, (see, for example, DE 196 115 48).

In a further preferred embodiment of the compander circuit according to the invention, a circuit is additionally provided comprising active finite impulse response (FIR) filters which can produce a replica of the total echo and subtract this replica from the useful signal transmitted to the respective telecommunications apparatus. As line echoes are filtered out in addition to being masked, the echo cancellation becomes even more effective, so that the echo performance is further improved.

In yet another preferred embodiment, the adaptive FIR filters are also implemented on an ASIC chip, preferably on the same ASIC chip as the compander circuit. Then the hardware units necessary for multichannel echo cancellation are particularly compact and inexpensive to manufacture.

Alternatively, the adaptive FIR filters can be implemented by a computer program which can calculate the echoes to be replicated in real time and subtract them from the useful signal on the respective communications channel. Also, the compander circuit itself can be implemented as a computer program. This reduces the hardware for the echo canceller according to the invention to a minimum, and by modifying or replacing the computer program, system modifications can be carried out in a simple manner.

In a further preferred embodiment of the compander circuit according to the invention, a device is additionally provided for detecting non-speech signals on a communications channel, particularly for detecting modem or fax signals. This permits the echo-canceling function to be automatically disabled in the presence of non-speech signals, which increases the reliability of fax or modem connections, since modems frequently have echo cancelers (with quantized feedback) of their own.

In a further development of this embodiment, all memory units of the device for detecting non-speech signals are also designed as MBD units. This allows the overall circuit to be constructed from standardized subassemblies, which greatly reduces the manufacturing costs.

Advantageously, a discrete Fourier transform (DFT) or a Goertzel algorithm is implemented on the device for detecting non-speech signals. Since the Goertzel algorithm requires extremely little storage space and computing capacity, according to the present invention, the additional function of detecting non-speech signals can be implemented at particularly low cost by the use of MBD units.

In still another preferred embodiment, the N cells of the buffer of each of the MBD units contain a master-slave flip-flop for temporarily storing a binary value. In this manner, simultaneous reading from and writing into the cells becomes possible in a single clock cycle.

Further advantages of the invention will become apparent from the following description when taken in conjunction with the accompanying drawings. According to the invention, the aforementioned features and the features described in the following can be used alone or in arbitrary combinations. While particular embodiments of the invention are shown and described, it is to be understood that the description is made only by way of example and not as a limitation to the scope of the invention.

The upper part of FIG. 1 shows the time variation of a sequence of near-end component echoes, which are delayed by up to 128 ms with respect to the instant the signal is transmitted by the respective subscriber. Such line echoes are caused by reflections at exchanges, network hybrids, and other types of nodes in the network, but are not disturbing if there is no appreciable delay (order of 10 ms) between the instant the original signal is transmitted and the instant an echo is received, since a talker at a telecommunications terminal will automatically "compensate for", and therefore tolerate, a certain echo effect as he also perceives acoustic echoes in the room around him and noise borne in his own body.

Line echoes become very annoying, however, if the delays exceed 30 ms, which is shown in FIG. 1. Such far-end echoes with delays on the order of up to 640 ms may occur, for example, during continental long-distance calls or during intercontinental calls. If a signal is transmitted from one continent to another via one or more satellites, the delay is usually about 250 ms. At the instant such a far-end echo is received by the original sender, the latter has continued talking, so that the echo effect is particularly disturbing. Similarly long delays may occur if a speech signal is subjected to heavy compression and decompression, or if it needs to be delayed parallel with a compressed image transmission in order to maintain lip synchronization.

A compander circuit for masking such line echoes, which arrive at the sending subscriber in silent intervals, is already known in the art for single-channel operation. FIG. 2 shows such a prior-art single-channel compander circuit 10 in a schematic diagram. On a send path $x_1$-$y_2$, a signal sent from a near-end subscriber 1 to a far-end subscriber 2 is present, of which far-end echoes reflected in the transmission system, which may consist of several component echoes, can return over a receive path $x_2$-$y_1$ to the near-end subscriber 1. To suppress these echoes, the send signal on the send path $x_1$-$y_2$ is picked off and fed through an input $x'_1$ to an estimator module which is also fed, via a further input $x'_2$, with the receive signal $z_{in}(k)$ coming from the far-end subscriber 2 over the receive path $x_2$-$y_1$. This receive signal may be impaired by echoes.

In the estimator module 11, echo coupling, delays, receive levels, and background noise are calculated, and corresponding instructions are sent over a control signal path 12 to a characteristic module 13 which generates a corresponding characteristic to control, via a multiplier 14, the short-time output level $z_{out}(k)$ as a function of the short-time input level $z_{in}(k)$ of the echo-impaired signal on the receive path $x_2$-$y_1$ in such a manner that the signal level is reduced during non-speech intervals of the far-end speaker and raised during speech periods in order to suppress any echoes on the useful signal during the non-speech intervals, where they could be perceived by the near-end subscriber 1. The correspondingly treated output signal is passed to the near-end subscriber 1 at an output $y'_1$.

Figure 4A:
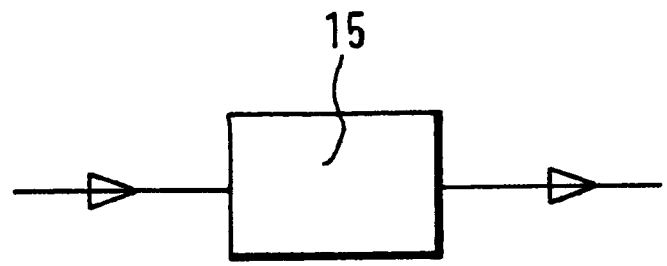
FIG. 4a shows a memory cell in the single-channel compander circuit.

To attain the above object, both the estimator module 11 and the characteristic module 13 contain a plurality of memory cells 15 which perform different functions but are generally identical in construction, so that they are designated in FIG. 2 by identical reference characters. Such a memory cell for a single sample is shown schematically in FIG. 4a. It stores a sample with, e.g., 16 bits.

A schematic diagram of the compander circuit 20 according to the invention for simultaneously providing N communications channels with an echo-canceling function is shown in FIG. 3. On the send path $x_1 \rightarrow y_2$, a plurality of signals of channels 1 to N are present; this is shown in FIG. 3 in the box at the upper left as time variation of the different samples of the signals of the N communications channels.

These samples are fed through the input $x'_1$ into the compander circuit 20 using time-division mutiplexing at a clock rate increased N-fold as compared with the prior-art single-channel compander circuit shown in FIG. 2. The same applies to the receive path $x_2 \rightarrow y_1$, where the samples of the receive signals from the incoming channels, shown schematically in FIG. 3 in another box at the lower right, are fed into the inputs $x'_2$ at a rate N times higher than in a single-channel compander circuit 10.

Via the inputs $x'_1$ and $x'_2$, the estimator module 21 is supplied, at the N-fold clock rate, with the respective samples, from which it estimates the echo couplings and delays and forms corresponding control signals which it transfers over a control line 22 to the characteristic module 23. The latter generates the corresponding characteristics, which are fed into a multiplier 24 to control the short-time output level $z_{out}(k)$ of the useful signal on the kth channel as a function of the short-time input level $z_{in}(k)$ for the purpose of echo cancellation.

All memory units in the modified compander circuit 20 according to the invention are designed as multiplexer-buffer-demultiplexer (MBD) units 30, which will be explained in more detail below with reference to FIG. 4b. The multichannel compander circuit 20 further includes a modulo-N counter 26 which controls the MBD units 30 in the estimator module 21 and in the characteristic module 23 over an address bus 27 in such a way that in each of the MBD units 30, always the same memory cell assigned to a particular channel (in the example shown the kth channel) is addressed.

A typical compander characteristic with which the short-time output level $z_{out}(k)$ is controlled as a function of the short-time input level $z_{in}(k)$ is shown in FIG. 3 at the lower left. The correspondingly treated signals of the N channels are delivered at the output $y'_1$, of the multichannel compander circuit 20, at a rate N times higher than in a single-channel compander circuit 10, to the receive path to a plurality of near-end subscribers 1.

Figure 4B:
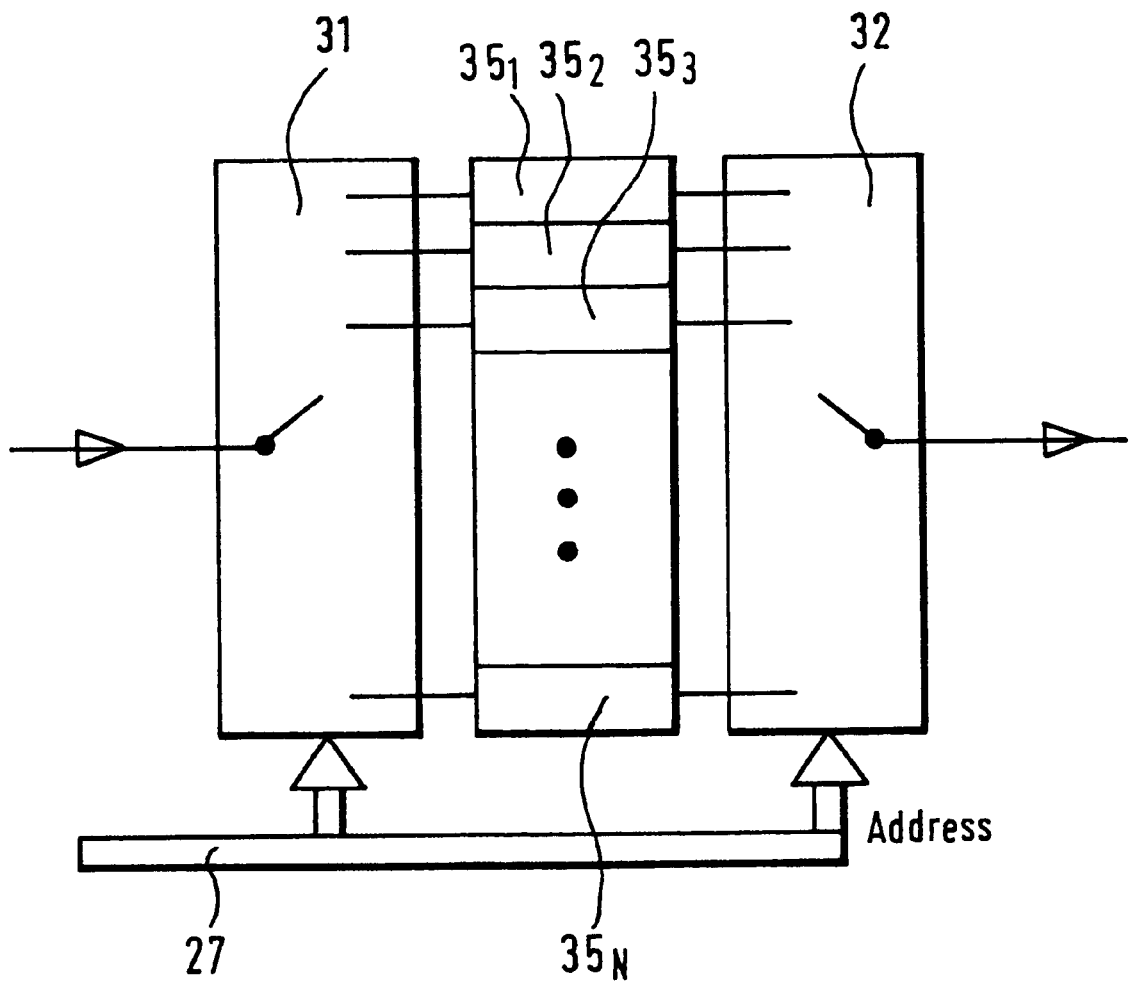
FIG. 4b is a schematic diagram of the structure of an MBD unit.

FIG. 4b shows schematically the structure of one of the MBD units 30, which is controlled by the modulo-N counter 26 over the address bus 27. A number N of parallel-connected memory cells $35_1$, $35_2$, . . . , $35_N$ equal to the number of communication channels are provided which store one sample each, the samples being transferred into the cells via a multiplexer 31 and read from the cells via a demultiplexer 32. The cells may contain master-slave flip-flops as basic elements for temporarily storing one binary value each.

The compander circuit 20 according to the invention can be implemented on an ASIC chip. In embodiments not shown in the drawings, the MBD units can also be implemented on an external memory chip separate from the ASIC, preferably on a RAM chip. A digital signal processor (not shown) may be provided which can activate or deactivate different types of characteristics in the characteristic module 23 and/or determines the echo delays in each channel and passes these values to the estimator module 21.

Furthermore, in embodiments not shown in the drawings, a circuit may additionally be provided comprising adaptive finite impulse response (FIR) filters which produce a replica of the total echo and subtract this replica from the useful signal transmitted to the respective telecommunications apparatus. In particular, the adaptive FIR filters may be implemented on the some ASIC chip as the compander circuit.

In further embodiments not shown in the drawings, a device may additionally be provided for detecting non-speech signals on one of the communications channels to be served, particularly for detecting modem or fax signals, which permits an automatic echo canceler disabling function as is required in ITU-T Recommendation G.165.

What is claimed is:

1. A compander circuit (20) for echo cancellation in telecommunications apparatus, such as terminals, transmission systems, or switching equipment, having an input $x'_1$, at which a send signal sent from a near-end subscriber (1) to a far-end subscriber (2) is applied, an input $x'_2$, at which a receive signal $z_{in}(k)$ coming from the far-end subscriber (2) and a far-end echo, consisting of one or more component echoes, are applied, an output $y'_1$, at which the receive signal $z_{out}(k)$ processed in the compander circuit (20) is passed on to the near-end subscriber (1), an estimator module (21) for estimating an echo coupling and a delay of a line echo, and a characteristic module (23) with an associated multiplier (24) for controlling the short-time output level of $z_{out}(k)$ as a function of the short-time input level of $z_{in}(k)$, wherein at all inputs and outputs of the compander circuit (20), a plurality of N communications channels are applied and outputted, respectively, at an N-fold clock rate as compared with a single communications channel;

all memory units in the compander circuit (20) are designed as multiplexer-buffer-demultiplexer (MBD) units (30); and a modulo-N counter (26) is provided which controls all MBD units (30) in such a manner that in each of the MBD units (30), always the same memory cell ($35_1$, $35_2$, $35_N$) assigned to a particular communications channel is addressed.

2. A compander circuit as claimed in claim 1, characterized by being implemented on an application-specific integrated circuit (ASIC) chip.

3. A compander circuit as claimed in claim 2, characterized in that the MBD units (30) are implemented on an external memory chip separate from the ASIC, preferably on a random access memory (RAM) chip.

4. A compander circuit as claimed in claim 1, characterized in that in addition, a circuit is provided comprising adaptive finite impulse response (FIR) filters which can produce a replica of the total echo and subtract said replica from the useful signal transmitted to the respective telecommunications apparatus.

5. A compander circuit as claimed in claim 4, characterized in that the adaptive FIR filters are implemented on an ASIC chip, preferably on the same ASIC chip as the compander circuit (20).

6. A compander circuit as claimed in claim 4, characterized in that the adaptive FIR filters and/or the compander circuit (20) are implemented by a computer program which can compute the echoes in real time and subtract them from the useful signal on the respective communications channel.

7. A compander circuit as claimed in claim 1, characterized in that in addition, a device is provided for detecting non-speech signals on a communications channel, particularly for detecting modem or fax signals.

8. A compander circuit as claimed in claim 7, characterized in that all memory units of the device for detecting non-speech signals are also designed as MBD units (30).

9. A compander circuit as claimed in claim 7, characterized in that on the device for detecting non-speech signals, a discrete Fourier transform and/or a Goertzel algorithm are implemented.

* * * * *